United States Patent [19]

Mori et al.

[11] Patent Number: 4,546,393
[45] Date of Patent: Oct. 8, 1985

[54] DIGITAL DATA TRANSMISSION SYSTEM WITH MODIFIED NRZI

[75] Inventors: Takaro Mori; Susumu Saito, both of Sagamihara; Yasuhiko Fujii, Yamato, all of Japan

[73] Assignee: Victor Company of Japan Limited, Yokohama, Japan

[21] Appl. No.: 463,083

[22] Filed: Feb. 2, 1983

[30] Foreign Application Priority Data

Feb. 10, 1982 [JP] Japan ................. 57-20372

[51] Int. Cl.$^4$ ............................................. G11B 5/09
[52] U.S. Cl. ..................................................... 360/40
[58] Field of Search ............................ 360/40, 41, 39

[56] References Cited

U.S. PATENT DOCUMENTS 4,234,898 11/1980 Katsuya et al. ................. 360/41
4,310,860 1/1982 Leiwer .................................. 360/40
4,369,472 1/1983 Tanaka et al. ..................... 360/40

Primary Examiner—Vincent P. Canney
Attorney, Agent, or Firm—Jordan and Hamburg

[57] ABSTRACT

A method and apparatus for digital magnetic recording of data in which digital data is recorded on a magnetic recording medium after being demodulated by the NRZI (Non-Return-to-Zero Inverted) system and read thereoutof timed to magnetic flux reversal caused by the recorded data on the recording medium. The digital data is encoded in a predetermined manner before the NRZI modulation so that at least part of "false" bits contained in the digital data is converted into "true" bits, resulting in an increase in the number of "true" bits. The encoded data is written into the recording medium after the NRZI modulation. In the event of reproduction of the data from the recording medium, self-clocking occurs to generate a data readout timing. The increased number of "true" bits insures desirable self-clocking. The data read from the recording medium is decoded to the original digital data.

5 Claims, 39 Drawing Figures

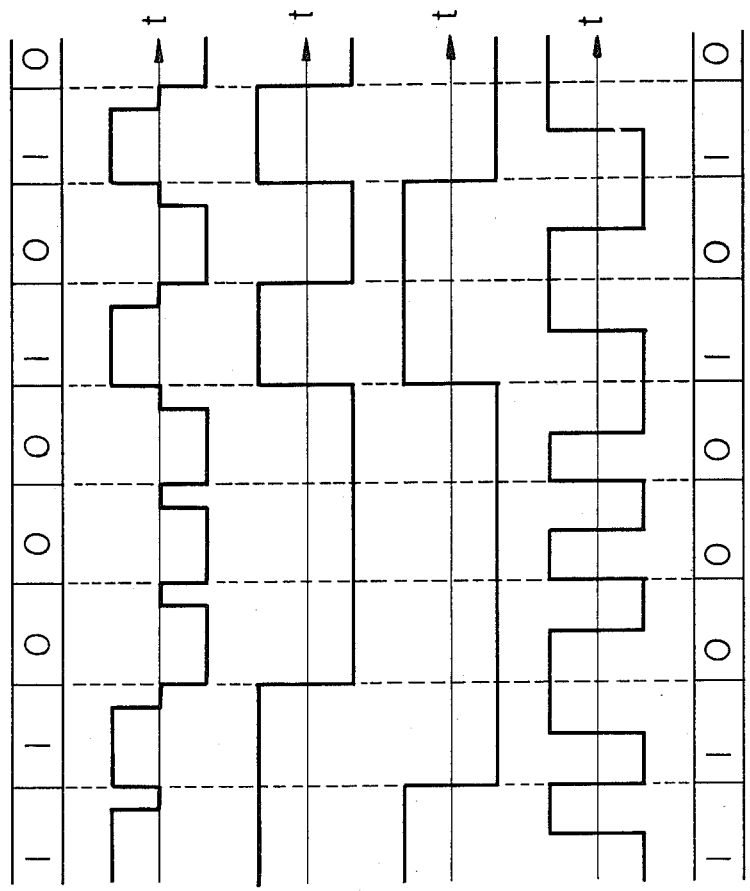

| P | Q | P ⊕ Q |
|---|---|-------|
| 0 | 0 | 0 |
| 0 | 1 | 1 |
| 1 | 0 | 1 |
| 1 | 1 | 0 |

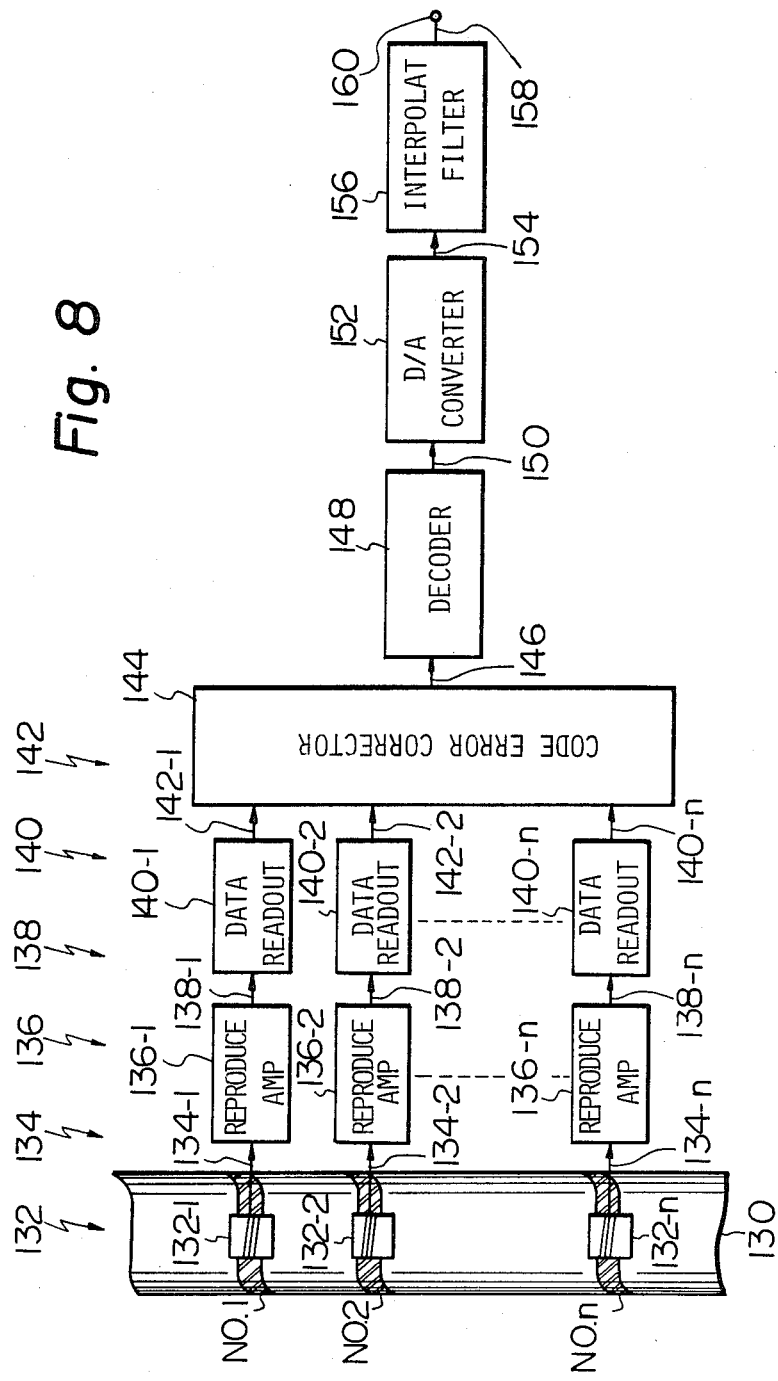

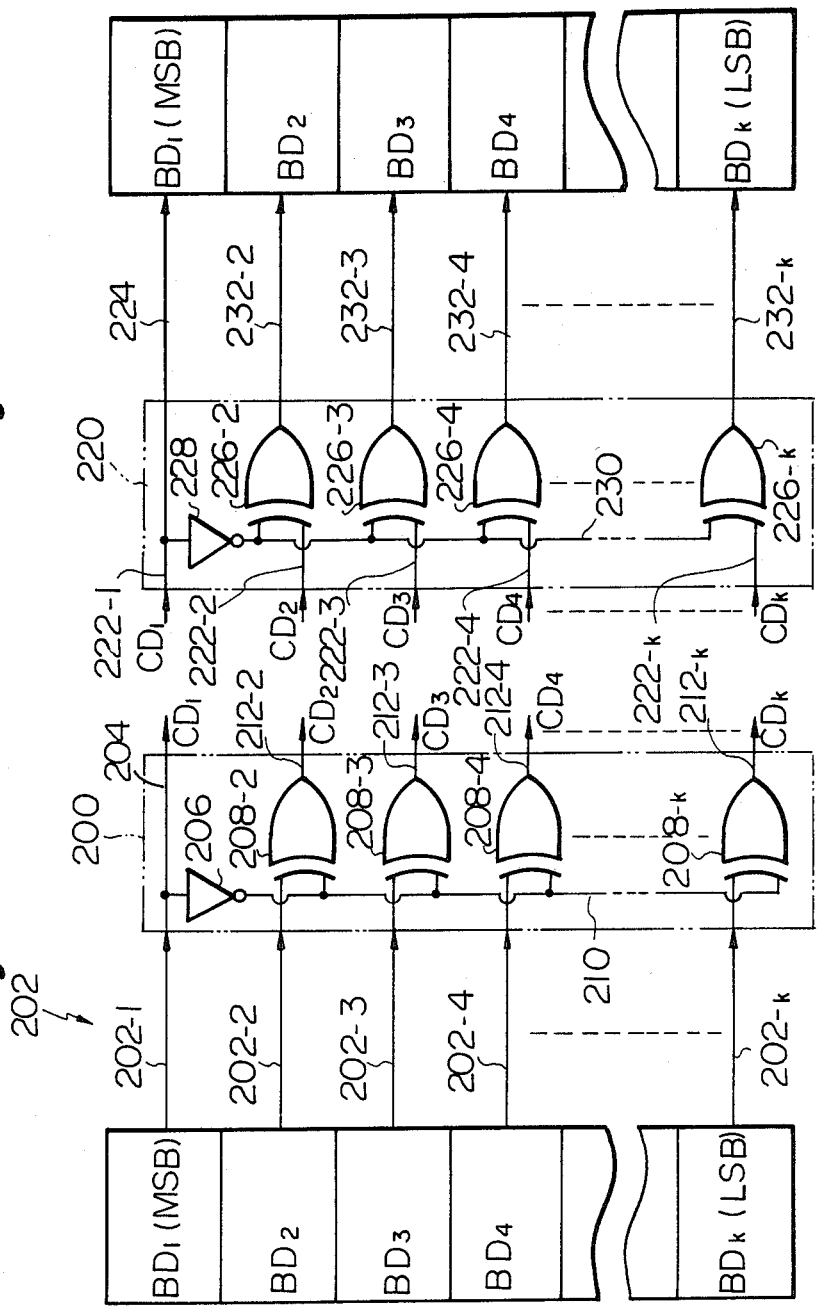

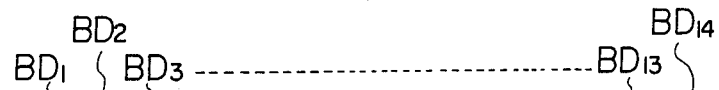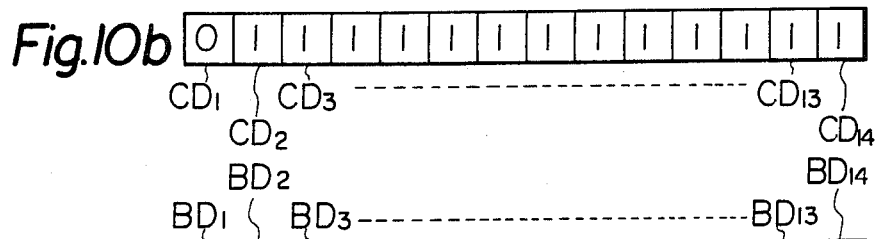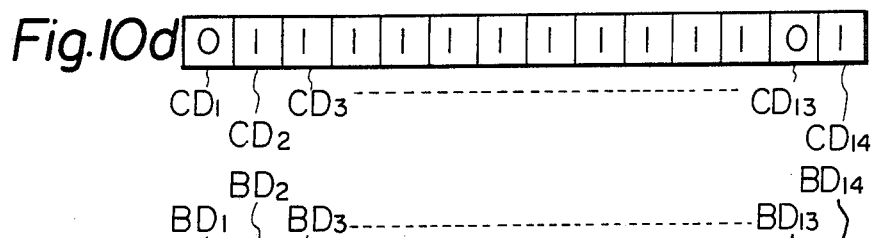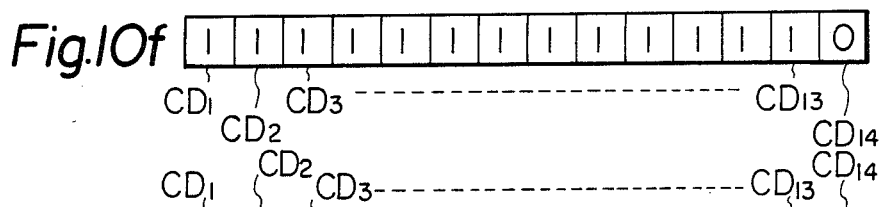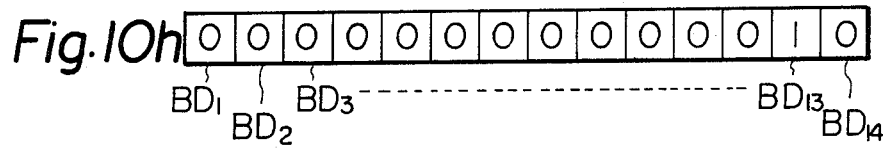

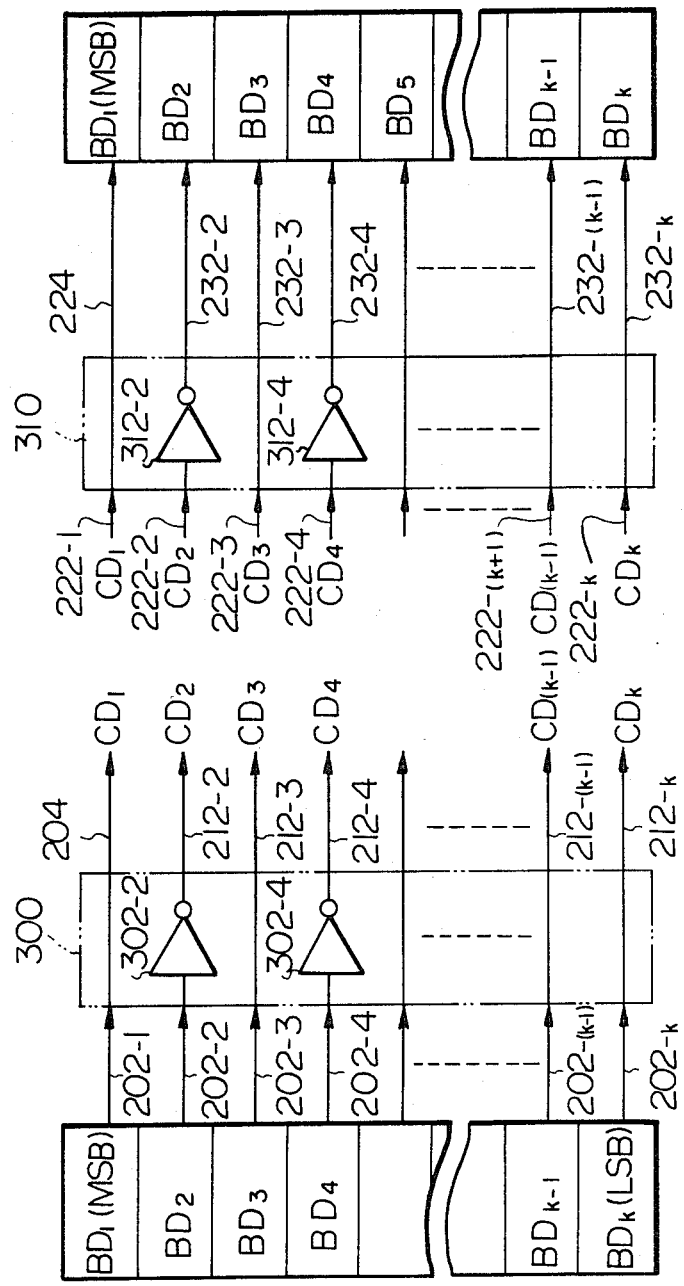

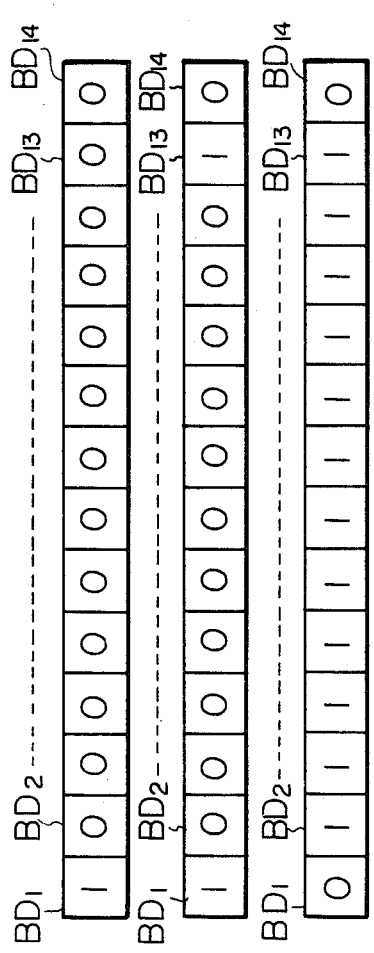
Fig. 15a
Fig. 15b
Fig. 15c
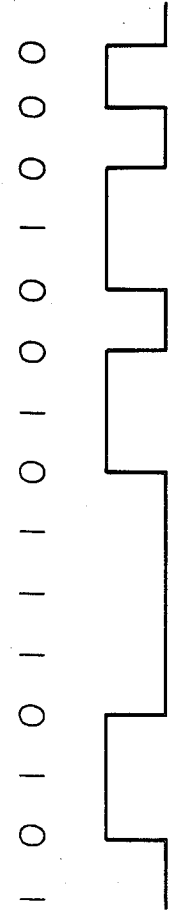
Fig. 16

DIGITAL DATA TRANSMISSION SYSTEM WITH MODIFIED NRZI

BACKGROUND OF THE INVENTION

The present invention relates to a method and apparatus for recording digitized data on a magnetic recording medium and reproducing the recorded data and, more particularly, to a method and apparatus for digital magnetic recording and reproduction of data which is applicable to signals in the audible band which are modulated by the NRZI (Non-Return-to-Zero Inverted) system.

Methods and apparatuses heretofore known for high-density digital data recording and reproduction generally employ a modulation system which is capable of causing self-clocking. When digital data is to be read from a magnetic recording medium, the timing of a magnetic flux reversal or transition is detected in response to a signal induced in a magnetic head upon the flux reversal. The phase of a data read clock is determined on the basis of the detected flux reversal timing, which in turn determines a data read timing. Thus, self-clocking causes a reproduced signal to determine a reproduction clock timing for itself.

The ease of self-clocking becomes greater as the flux reversal is caused more frequently by digital data recorded on a recording medium. As well known in the art, for easier self-clocking, it is desirable that the maximum flux reversal interval be limited to a certain value to allow the reversal to surely exist, and that the minimum flux reversal interval be also limited to a certain value to minimize interference between waveforms. Various digital modulation systems have been proposed to satisfy such demands.

Typical examples of digital modulation systems hitherto known may be the RZ (Return-to-Zero) system, NRZ (Non-Return-to-Zero) system, NRZI (Non-Return-to-Zero Inverted) system and PE (Phase Encoding) system. Of these systems, the NRZ or NRZI system is most fundamental and has the following features:

A modulator is needless or requires only a simple construction.

The minimum flux reversal interval can be made long and the required transmission band, narrow.

The system is suitable for high-density recording.

Self-clocking is generally difficult to occur because the maximum flux reversal interval is infinite.

Particularly, the NRZI system is desirably applicable to differentiation type recording media such as magnetic recording media, because information is contained in each flux reversal.

Now, signals in the audible band as typified by voice and music signals are free from d.c. components. In this respect, self-clocking will not always be impossible when the NRZI modulation system is used to record digital data on a magnetic recording medium for recording and reproducing such audible band signals. This opens the way for high-density data recording and reproduction by use of an apparatus having a simple construction. Still, the audible band signals in nature involve low signal levels which appear very frequently, and even involve no-signal periods. In this regard, sufficient self-clocking cannot be expected from the NRZI modulation system.

The inconvenience discussed above may be eliminated by any one of conventional implements such as employing a conversion rule to cause flux reversal during demodulation or adding an M-series code to give randomness which will insure a certain degree of flux reversal. However, these known implements are not satisfactory because they lack due consideration of the described characteristics of audible band signals.

SUMMARY OF THE INVENTION

In one aspect of the present invention, a magnetic recording method is provided which records digital data on a magnetic recording medium after modulating the digital data by the NRZI (Non-Return-to-Zero Inverted) system, and causes the modulated data to be read from the recording medium timed to magnetic flux reversal of the recording medium. At least part of "false" bits contained in the digital data is converted into "true" bits by encoding the digital data before the NRZI demodulation. The NRZI modulated data is read from the recording medium, demodulated and then decoded.

In another aspect of the present invention, a magnetic recording apparatus is provided in which digital data is recorded on a magnetic recording medium after being modulated by the NRZI system, and read from the recording medium timed to magnetic flux reversal of the recording medium. Encoder means encodes the digital data before the NRZI modulation to convert at least part of "false" bits contained in the digital data into "true" bits. Decoder means demodulates the NRZI modulated data which is read from the recording medium and then decodes the bits encoded by the encoder means.

It is an object of the present invention to effect self-clocking taking into account the inherent nature of voice, music and other audible band signals.

It is another object of the present invention to effect satisfactory self-clocking by means of a simple circuit arrangement.

It is another object of the present invention to effect efficient and reliable self-clocking.

It is another object of the present invention to reduce the code error rate in reproduced data by promoting desirable self-clocking.

It is another object of the present digital invention to provide a generally improved method and apparatus for digital magnetic recording and reproduction of data.

Other objects, together with the foregoing, are attained in the embodiments described in the following description and illustrated in the accompanying drawings.

BRIEF DESCRIPTION OF THE DRAWINGS

FIGS. 1a–1d are diagrams showing waveforms which represent various digital modulation systems;

FIGS. 5a–5d are diagrams of exemplary digital data;

FIG. 8 is a block diagram a digital magnetic reproducing apparatus embodying the present invention;

FIGS. 9a and 9b are block diagrams showing details of an encoder circuit and a decoder circuit, respectively;

FIGS. 10a–10h are diagrams explanatory of operations of the circuits shown in FIGS. 9a and 9b;

FIG. 11 is a table demonstrating the operation of XOR gates;

FIGS. 13a and 13b are block diagrams showing another embodiment of the encoder and decoder circuits, respectively;

FIGS. 15a–15c are diagrams of digital data trains each being represented by the offset binary mode; and FIG. 16 is a diagram of a signal waveform provided by the negative logic of the NRZI system.

DESCRIPTION OF THE PREFERRED EMBODIMENTS

While the method and apparatus for digital magnetic recording and reproduction of data of the present invention is susceptible of numerous physical embodiments, depending upon the environment and requirements of use, substantial numbers of the herein shown and described embodiments have been made, tested and used, and all have performed in an eminently satisfactory manner.

To facilitate understanding of the present invention, a brief reference will be made to prior art digital modulation systems, depicted in FIGS. 1a–1d to 5a–5d.

Referring to FIGS. 1a–1d, variations of signals in typical digital modulation systems are shown with respect to time t. Digital data to be modulated by such systems are shown above and below the signal waveforms. In the RZ system shown in FIG. 1a, the signal varies to the positive level in response to a digital ONE and to the negative level in response to a digital ZERO, while returning to the reference level once for every bit. Although this modulation system attains self-clocking with ease, it is lower in available recording density than the NRZ or NRZI system which will be described.

Shown in FIG. 1b is the NRZ SYSTEM which is the simplest modulation system due to the fact that the signal merely varies to the positive level in response to digital ONE's and to the negative level in response to digital ZEROES. A drawback inherent in this system is that when a long string of ONE'S or ZEROES appears, the signal level does not vary at all rendering self-clocking difficult. In the NRZI system, shown in FIG. 1c, the signal level becomes inverted only when the digital data is a ONE. Self-clocking is easy in the NRZI system as long as ONE is predominant in a stream of data bits, but not so when ZERO is predominant in which case the maximum flux reversal interval is infinite. Still, the NRZI system is quite effective for magnetic recording media and like differentiation type media because information is contained in those portions where the level varies. Another advantage of the NRZI system resides in a relatively high data recording density.

FIG. 1d demonstrates the PE (Phase Encoding) system in which the signal level rises when the digital data is ONE but drops when the digital data is ZERO. This system is capable of effecting easy self-clocking.

Besides the systems described above, some other digital modulation systems are known such as the MFM (Modified Frequency Modulation) and 3PM (3-Position Modulation) systems.

Figures 2A, 2B, 2C, 2D, 2E, 2F:
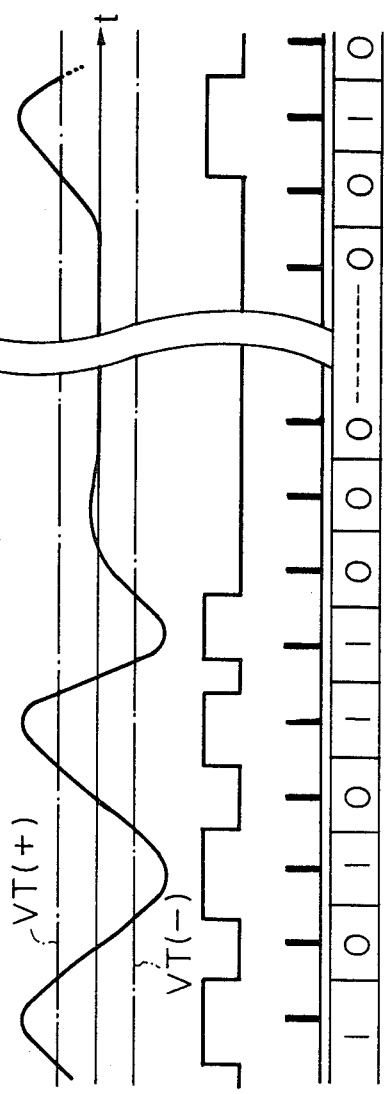
FIGS. 2a–2f are diagrams showing a series of data modulating and demodulating steps in the NRZI system.

Of the various modulation systems shown and described, the NRZI modulation system will be described in detail. FIGS. 2a–2f illustrate signal waveforms which represent a process for writing NRZI modulated digital data into a magnetic recording medium and a process for reading the data thereoutof by amplitude detection. An example of digital data to be recorded is shown in FIG. 2a, and the NRZI modulated version of the digital data, in FIG. 2b. As shown, the level of the signal waveform becomes inverted when the digital data is ONE but not when it is ZERO. In FIG. 2a or 2b, $T_{min}$ indicates the minimum flux reversal interval while the broken portion indicates a period in which a stream of ZERO bits appear continuously. As ZERO successively appears as illustrated, the signal level in the NRZI system does not vary to make the maximum flux reversal interval $T_{max}$ very long, infinite in theory. The result is the difficulty in self-clocking.

The signal waveform of FIG. 2b is applied to a magnetic record head to be recorded thereby on a magnetic recording medium. Thereafter, the signal is reproduced from the recording medium as indicated in FIG. 2c. As well known in the art, a magnetic head shows differentiation characteristics during playback and the reproduced signal waveform, therefore, is not identical with the waveform of FIG. 2b but varied along a smooth curve as shown in FIG. 2c.

Figure 3:
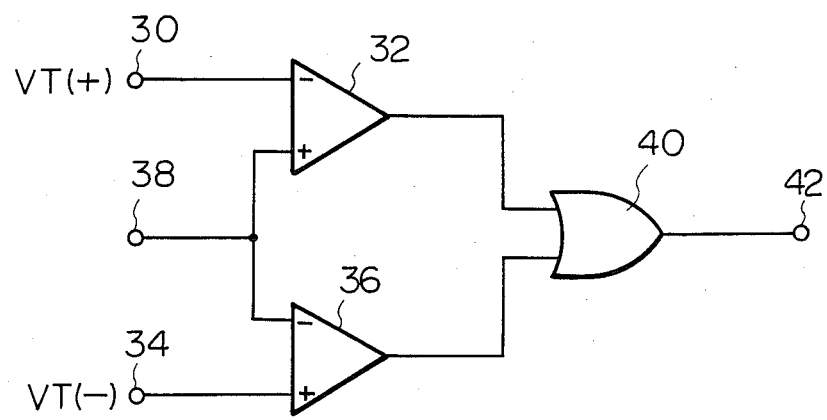
FIG. 3 is a block diagram showing an example of an amplitude detection circuit.

The reproduced signal shown in FIG. 2c may be fed to an amplitude detection circuit shown in FIG. 3. The amplitude detector has a terminal 30 which connects to a negative input of a comparator 32 and a terminal 34 which connects to a positive input of a second comparator 36. The terminal 30 is supplied with a reference voltage VT(+) and the terminal 34 with a reference voltage VT(−) each from the outside. The levels of the reference voltages VT(+) and VT(−) are shown in FIG. 2c relative to the reproduced signal. A terminal 38, to which the reproduced signal is coupled, is connected to the positive input of the comparator 32 and the negative input of the comparator 36. The outputs of the comparators 32 and 36 are connected to an OR gate 40 which is in turned connected to an output terminal 42, as which a signal waveform shown in FIG. 2d appears. In FIG. 3, when the reproduced signal level rises beyond the reference voltage VT(+), the output of the comparator 32 changes from (logical) "0" to "1" level; when the reproduced signal level drops beyond the reference voltage VT(−), the output of the comparator 36 changes from "0" level to "1" level. The OR gate 40, therefore, delivers the output shown in FIG. 2d.

Suppose that clock pulses are generated as shown in FIG. 2e for reading data out of the recording medium. While the self-clocking is normal, the clock pulses well follow any speed change or jitter during playback. Timed to these clock pulses, data is read out of the output waveform shown in FIG. 2d as indicated in FIG. 2f. It will be seen that the digital data of FIG. 2f is identical with the digital data of FIG. 2a.

As already mentioned, the clock pulses shown in FIG. 2e are generated at a timing which is determined by the signal shown in FIG. 2c or 2d. Thus, where a concecutive string of ZEROES appears as indicated in the broken portion of FIG. 2d, it is difficult to set up such a clock timing because the flux would not be reversed to entail no change in the signal level. This prevents the clock pulses of FIG. 2e from well following a speed change, jitter or the like, thereby enhancing the tendency to code errors in the reproduced data.

Figure 4:
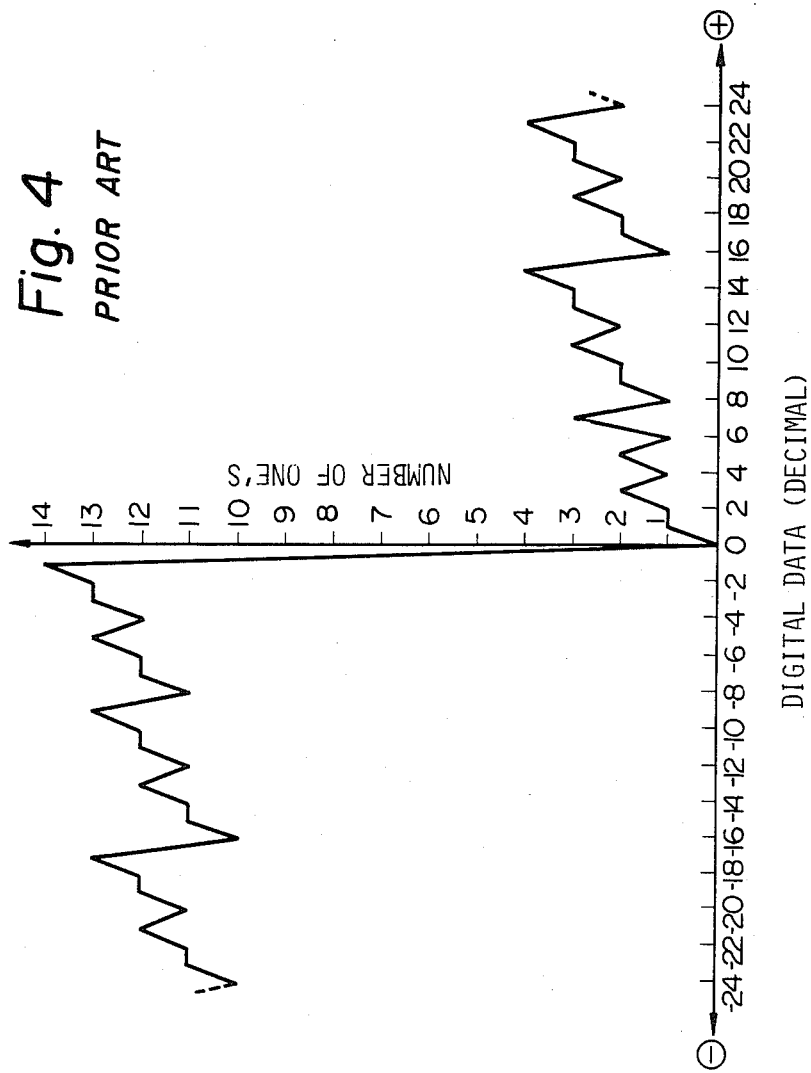
FIG. 4 is a graph showing a number of binary ONE'S contained in a 14-bit digital data train which is represented by the 2's complement mode.

Referring to FIG. 4, analysis will be given of the number of ONE'S contained in a train of digital data, assuming a case in which the data train comprises 14 bits and is expressed in the 2's complement mode. In FIG. 4, the abscissa indicates positive and negative digital data by the decimal system while the ordinate indicates the number of ONE'S contained in a data train. For example, when data is decimal "+2" as indicated in FIG. 5a, the second bit from LSB (Least Significant Bit) 52 is ONE and the other bits are all ZEROES. That is, the number of ONE contained in the decimal "+2" is one.

When data is decimal "−2", due to the 2's complement expression, it corresponds to the digital data shown in FIG. 5d which is given by subtracting from the base of FIG. 5c the digital data of FIG. 5b which is the digital expression of decimal "+2". In detail, a complement which is usually used for subtraction in computers or the like is a number represented by $(N-Y)$ where N is a base. For example, subtraction of two numbers x and y, $(x-y)$, may be performed assuming a base N;

$$x - y = x - y + N - N$$
$$= x + (N - y) - N$$

When y in the above equation is expressed by the complement $(N-y)$, $x+(N-y)$ can be regarded as the sum of x and the complement of y to N, $(N-y)$. Stated another way, subtraction can be replaced by addition by using a complement. In this connection, the digital data shown in FIG. 5b corresponds to y, the digital data shown in FIG. 5c to the base N, and the data shown in FIG. 5d to the complement $(N-Y)$. As seen in FIG. 5d, decimal "−2" has thirteen ONE'S in a digital data train.

The plot shown in FIG. 4 was attained by determining the number of ONE'S contained in each digital data. It will be clear from FIG. 4 that self-clocking satisfactorily occurs in the case of negative digital data due to the relatively large number of ONE'S contained therein. However, self-clocking is quite difficult when the digital data is positive, particularly under the no-signal condition in which digital data in decimal representation is approximate to "0", due to the very small number of ONE'S or very large number of ZEROES. Under the no-signal condition in particular, ONE is entirely absent.

The no-signal period is typically observed in audible band signals such as voice and music signals; in the no-signal period, binary ZERO successively appears in the digital data. Concerning low signal levels which frequently occur in audible band signals, upper bits of the digital data remain ZERO so that the use of the NRZI system for writing such digital data into a recording medium would prevent stable self-clocking from occurring due to rare flux reversal. Thus, while the NRZI system is quite effective for differentiation type recording media such as a magnetic recording medium and features an inherently high recording density, it still fails to afford an acceptable degree of self-clocking function.

Reference will now be made to FIGS. 6–16 for describing a new and improved method and apparatus for digital magnetic recording of the present invention which eliminates the various drawbacks of the prior art systems.

Figure 6:
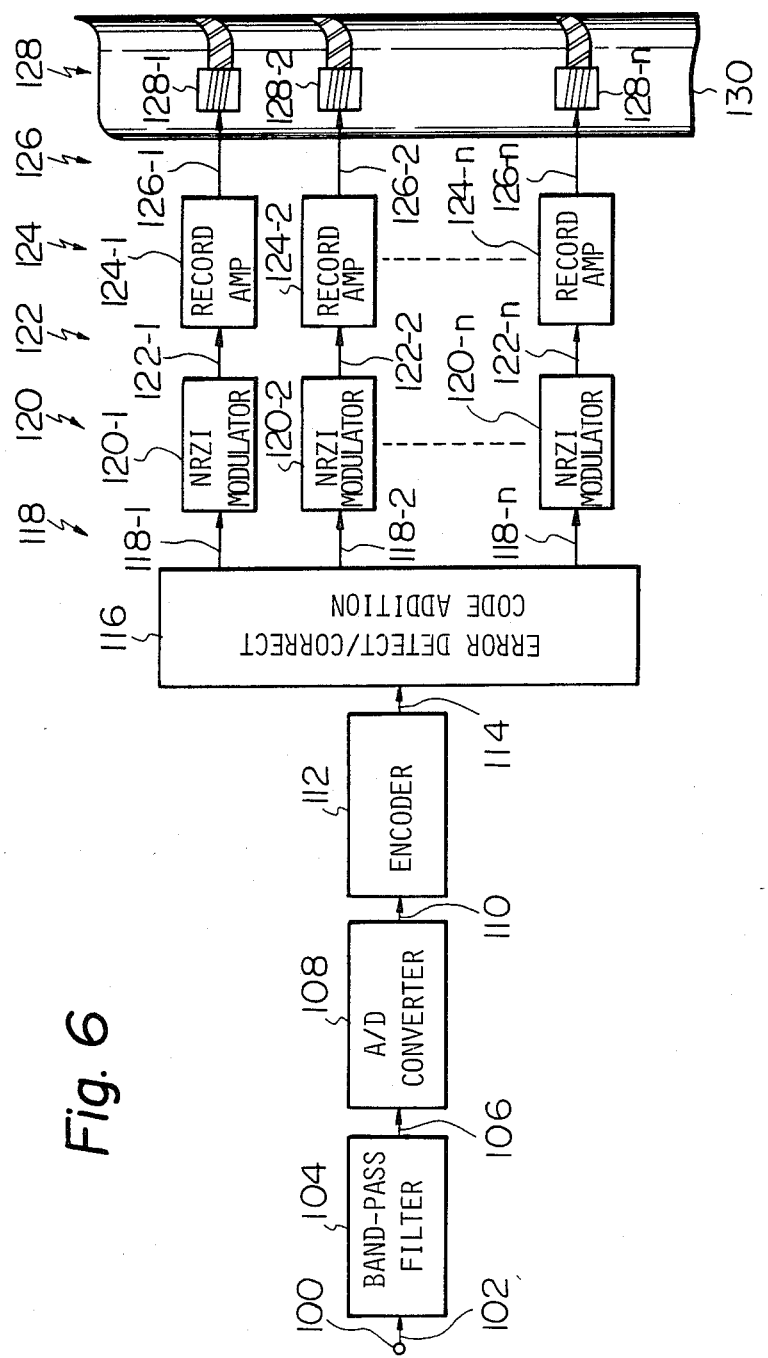
FIG. 6 is a block diagram of a digital magnetic recording apparatus embodying the present invention.

Referring to FIG. 6, there is shown a recording apparatus having an input terminal 100 which is connected by a line 102 to a band-pass filter 104 and supplied with an audible band analog signal such as a voice or music signal. The band-pass filter 104 is adapted to limit the frequency band of the input signal, thereby removing needless signal components. The band-pass filter 104 is connected by a line 106 to an analog-to-digital or A/D converter 108 which converts the input analog signal into digital data. The A/D converter 108 is connected by a line 110 to an encode circuit 112 which is in turn connected by a line 114 to a circuit 116 whose function will be described. The encode circuit 112 is constructed to encode the input digital data in a predetermined manner, that is, in a manner to increase the number of ONE bits in a string of data. This part constitutes an essential feature of the present invention and will be described later in detail.

The circuit 116 is adapted to add to the input signal a code for detecting and correcting any code error in the course of recording or playback. Another function of the circuit 116 is to output the data after driving and rearranging it to a format suitable for magnetic recording which will be described. The code for error detection/correction may include a CRCC (Cycle Redundancy Check Code) or a vertical parity code. Where memory interlacing or interleaving is practiced for promoting desirable correction of burst errors, the error detection/correction code adding circuit 116 will arrange the data in dispersion.

The circuit 116 is connected by lines 118-1 to 118-n to NRZI modulators 120-1 to 120-n so as to deliver signals by a plurality of channels. It will be noted that "A-i" in the demodulator group and onward designates the i-th one of an element group A. The NRZI demodulators 120 individually modulate output digital data of the circuit 116 by the NRZI system. The NRZI modulators 120-1 to 120-n are respectively connected by lines 122-1 to 122-n to record amplifiers 124-1 to 124-n. Each record amplifier 124 serves to amplify the modulated signal on its associated line 122 to a predetermined degree.

The amplifiers 124-1 to 124-n are connected by lines 126-1 to 126-n to record heads 128-1 to 128-n. Each amplified signal is thus fed by the line 126 to the record head 128 associated with the amplifier 124, thereby being recorded on a magnetic tape 130 which is the recording medium in this case.

Figure 7:
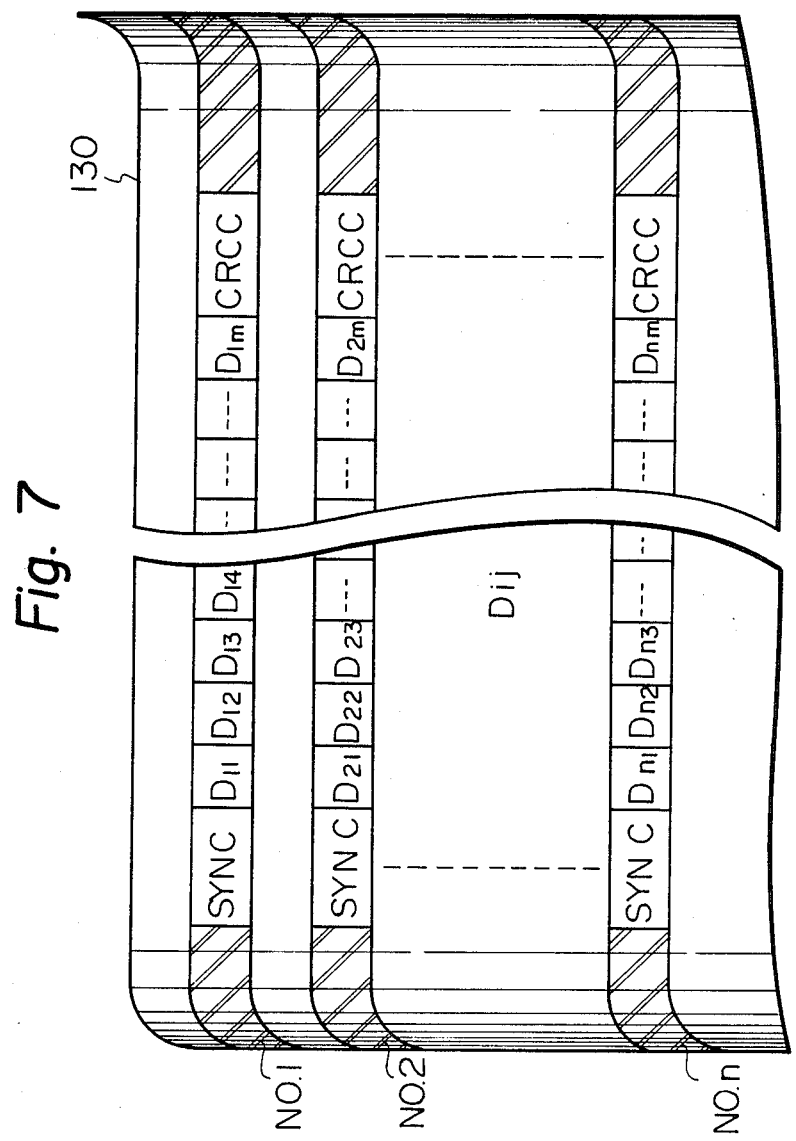
FIG. 7 is a view of exemplary data arrangement on a magnetic tape.

An example of the data recorded on the magnetic tape 130 is shown in FIG. 7. As shown, the tape 130 has a plurality of track Nos. 1-n. Each string or frame of data comprises a frame sync code Sync for frame synchronization, information or main data Dij to be recorded which follows the frame sync code Sync, and a check code CRCC for cyclic redundancy check which follows the data Dij. Where vertical parity is employed, vertical parity codes may be arranged in, for example, the track No. n.

Referring to FIG. 8, a reproducing apparatus is shown. "N" reproduce heads 132 are installed in the reproducing apparatus in one to one correspondence with the tracks Nos. 1-n of the tape 130. The reproduce heads 132-1 to 132-n are respectively connected by lines 134-1 to 134-n to reproduce amplifiers 136-1 to 136-n which are adapted amplify their inputs to a predetermined degree. The amplifiers 136-1 to 136-n are respectively connected by lines 138-1 to 138-n to data readout circuits 140-1 to 140-n whereby the amplified signals are individually demodulated by the NRZI system and then read out. For data readout, the amplitude detector shown in FIG. 3 may be employed to detect the amplitudes of the signals so that clock pulses for data readout shown in FIG. 2e are generated by self-clocking.

The data readout circuits 140-1 to 140-n are connected to a code error correct circuit 144 by lines 142-1 to 142-n, respectively. Based on the check code CRCC, for example, the code error corrector 144 processes input data from the lines 142 to detect and correct a code error. The code error corrector 144 is connected by a line 146 to a decode circuit 148 which functions to decode the error-free data. Thus, the decoding at the decoder 148 corresponds to the encoding at the encoder 112; the decoded data coincides with the digital data which is input to the encoder 112. In addition to the encoder 112, the decoder 148 constitutes another characteristic part of the present invention as will be described.

The decoder 148 is connected by a line 150 to a digital-to-analog or D/A converter 152 which is in turn connected by a line 154 to an interpolate filter 156, which is connected by a line 158 to an output terminal 160. The demodulated signal is converted into an analog signal by the D/A converter 152 and then has its high frequency component removed by the filter 156.

The construction and arrangement described so far, except for the encoder 112 and decoder 148, are well known to the art and will not be described any further herein.

Details of the encoder 112 and decoder 148 will be explained with reference to FIGS. 9a and 9b. The constructions illustrated apply to a case in which both the A/D converter 108 and D/A converter 152 operate in the 2's complement mode.

Referring to FIG. 9a, the encoder, here designated by the reference numeral 200, is supplied with data of data bits BD1 to BDk from the A/D converter 108 by lines 202-1 to 202-k, respectively. Of the data bits BD1–BDK, the data bit BD1 is MSB and the data bit BDk is LSB. The data in the data bit BD1 is coupled by the line 202-1 to a line 204 which directly leads to the outside of the encoder 200. The data in the data bit BD1 is also coupled to an inverter 206 via the line 202-1. The other lines 202-2 to 202-k are respectively connected to 2-input XOR (Exclusive OR) gates 208-2 to 208-k so that the data in the data bits BD2–BDk are respectively input to the XOR gates 208-2 to 208-k. Meanwhile, the inverter 206 is connected by a line 210 to the XOR gates 208-2 to 208-k so that the data in the data bit BD1 is inverted and fed to the XOR gates 208-2 to 208-k. The line 204 and the outputs of the XOR gates 208-2 to 208-k are commonly connected to the error detection/correction code adding circuit 116 shown in FIG. 6.

Referring to FIG. 9b, the decoder, here designated by the reference numeral 220, is connected by lines 222-1 to 222-k to the code error corrector 144 shown in FIG. 8. Of these lines 222, the line 222-1 directly connects to a line 224 while the lines 222-2 to 222-k respectively connect to 2-input XOR gates 226-2 to 226-k. The line 222-1 also connects to an inverter 228 which in turn connects via a line 230 to the XOR gates 226-2 to 226-k. Data in the data bit BD1 is delivered by the line 224 while the data in the other bits BD2–BDk are respectively delivered by lines 232-2 to 232-k. It will be seen in FIG. 9b that the data bits BD1–BDK represent the digital data which are input to the D/A converter 152, the data bit BD1 being MSB and the data bit BDK, LSB.

With the thus constructed encoder 200, the logical value of the data bit BD1, which is MSB, in the output digital data of the A/D converter 108 is maintained the same. On the other hand, each of the data bits, BD2 second from MSB to BDk, is converted into XOR (Exclusive OR) of the inverted version of the logical value of MSB and the logical value of the data bit. The conversion by the decoder 220 is such that, while the logical value of MSB of the input digital data is maintained the same, each of the data bits, second from MSB to LSB, is transformed into a logical value which is the XOR of the inverted version of the logical value of MSB and the logical value of the data bit.

The number of ONE's contained in the output data train of the A/D converter 108 will be understood from the plot shown in FIG. 4. MSB or data bit BD1 will be ONE when the input signal of the A/D converter 108 is positive voltage and ZERO when it is negative voltage. Thus, MSB serves as a sign bit indicative of a sign of the voice signal or the like input signal voltage.

Operations of the encoder 200 and decoder 220 will be described hereunder. In the following description, the bits of the data output from the lines 204, 212-2 to 212-k of the encoder 200 will be indicated by CD1 to CDk, respectively. The output data string of the A/D converter 108 will be assumed to comprise 14 bits.

When data output of the A/D converter 108 is decimal "0" which represents a no-signal condition, all the data bits BD1–BD14 are binary ZEROES as shown in FIG. 10a. When supplied to the encoder 200, ZERO of MSB or data bit BD1 of the digital data is allowed to pass therethrough without any conversion. Therefore, the data bit CD1 of the output is ZERO as shown in FIG. 10b. Meanwhile, the XOR gate 208-2 computes XOR for its two inputs as tabulated in FIG. 11. When the inputs P and Q coincide with each other, the XOR gate 208-2 delivers logical ZERO output; when otherwise, logical ONE output. In the example concerned, because the inputs of the XOR gate 208-2 are ZEROES in the data bit BD2 and ONE which is the inverted version of ZERO in the data bit BD1 or MSB, the output of the XOR gate 208-2 is logical ONE as indicated in the data bit CD2 in FIG. 10b. The other XOR gates 208-3 to 208-14 perform the same computation with the result that ONE'S appear in all the data bits CD3 to CD14 as shown in FIG. 10b.

Thus, the encoder 200 in accordance with the present invention causes a string of data to contain thirteen ONE'S even under the no-signal condition, which will suffice the self-clocking function.

When the data output from the A/D converter 108 is decimal "2", all the data bits are ONE except the data bit BD13 which is one higher than the data bit BE14 or LSB, as shown in FIG. 10c. Receiving the digital data, the encoder 200 directly delivers ZERO in the data bit BD1 or MSB so that the data bit CD1 of the output is ZERO as shown in FIG. 10d. The XOR gate 208-2 receives ZERO of the data bit BD2 and ONE given by the inverter 206 by inverting ZERO of the data bit BE1 or MSB. As a result, the output of the XOR 208-2 or data bit CD2 is ONE as shown in FIG. 10d. Similar operation occurs in the XOR gates 208-3 to 208-12 and 208-14 so that ONE's appear in the data bits CD3–CD14 as shown in FIG. 10d. The inputs of the XOR gate 208-13, on the other hand, are ONE of the data bit BD13 and ONE output from the inverter 206, the output of this XOR gate or data bit CD13 being ZERO as shown in FIG. 10d.

In this manner, the digital data which has conventionally contained only one ONE is encoded to have twelve ONE's in accordance with the present invention.

When the data output from the A/D converter 108 is decimal "−2", all the data bits are ONE'S as shown in FIG. 10e except for the data bit BD14 or LSB which is ZERO. When supplied with such digital data, the encoder 200 passes the ONE of the data bit BD1 or MSB without any modification so that ONE appears in the output data bit CD1 as indicated in FIG. 10f. Concerning the output of the XOR gate 208-2 or data bit CD2, it has ONE as shown in FIG. 10f because the XOR gate 208-2 receives ONE of the data bit BD2 on one hand and the inverted version ZERO of the data bit BD1 or MSB on the other hand. Again, similar operation is performed by the other XOR gates 208-3 to 208-13 resulting in a string of ONE'S in the data bits CD3–CD13 as shown in FIG. 10f. Meanwhile, the XOR gate 208-14 receives ZERO outputs of the data bits BD14 and inverter 206, making its output or data bit CD14 ZERO as indicated in FIG. 10f.

While the number of ONE'S in the prior art system has been thirteen in the just described situation which suffices the self-clocking purpose, the encoding operation particular to the present invention promotes desirable self-clocking without inviting any decrease in the number of ONE'S.

Figure 12:
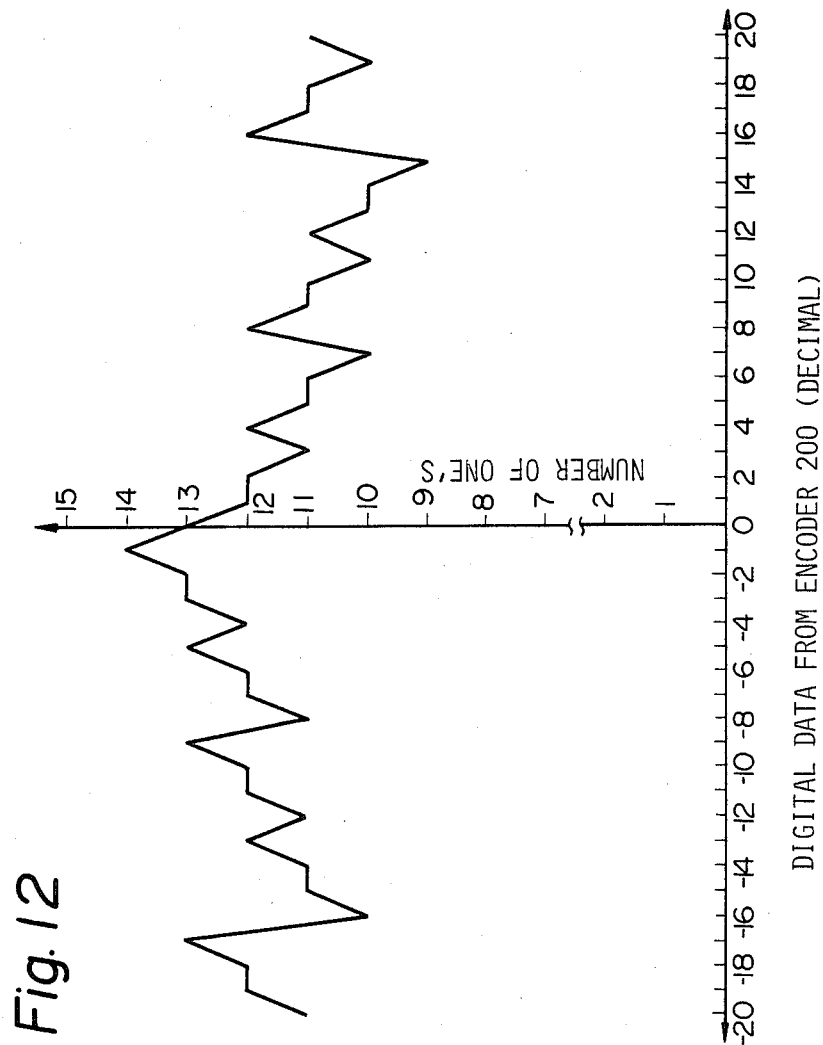
FIG. 12 is a graph showing a number of binary ONE'S contained in a 14-bit digital data train in accordance with the embodiment shown in FIGS. 9a and 9b.

FIG. 12 is a plot corresponding to the plot of FIG. 4 and showing the number of ONE'S contained in the encoded data output from the encoder 200. Comparing FIGS. 4 and 12, it will be apparent that using the encoder 200 to process output data of the 2's complement mode A/D converter 108 increases the number of ONE'S in the data output from the encoder 200 at and around decimal "0", i.e. under no-signal condition.

Thus, the embodiment described above employs the encoder 200 to convert the code of the digital data output from the A/D converter 108, which is operated in the 2's complement mode. Thereafter, the NRZI modulation system is adapted for recording the digital data on a magnetic recording medium. Such a procedure insures good self-clocking function during data playback even if the digitally recorded analog signal is a voice, music or like audible band signal which is occupied by a substantial period of no-signal condition or that of low signal level condition. The analog signal can be reproduced merely by decoding the digital data with the decoder circuit 200 having the construction of FIG. 9b and then transforming the decoded data with the D/A converter 152.

Turning back to FIG. 6, the logical values of the data bits CD1, CD2, . . . , CD14 shown in FIGS. 10b, 10d and 10f are fed to the error detection/correction code adding circuit 116 as digital data and thereby added with a CRCC or like error detection/correction code. The output signal of the circuit 116 is passed through each NRZI modulator 120 and record amplifier 124 to the record head 128 to be written into the magnetic tape 130.

For the reproduction of the data, each reproduce head 132 outputs a signal corresponding to the recorded data, the amplifier 136 amplifies the output signal of the head 132, and then the data read circuit 140 reads out the data. The code error corrector 144 detects and corrects any error caused by drop-out of data or the like before the delivery of the read data. This data is identical with the logical values of the data bits CD1 to CD14.

The decoder 220 will be operated as follows. FIG. 10g shows decimal "2" digital data which is output from the code error corrector 144. The digital data of FIG. 10g is identical with the data in the data bits CD1–CD14 of FIG. 10d. When supplied with this digital data, the decoder 220 passes ZERO of the data bit CD1 or MSB directly therethrough so that the data bit BD1 becomes ZERO as shown in FIG. 10h. The XOR gate 262-2 receives ONE'S one of which is of the data bit CD2 and the other is the inverted version of ZERO of the data bit CD1 or MSB. Hence, the output of the XOR gate 226-2 or data bit BD2 is ZERO as indicated in FIG. 10h. Similar operation occurs in the XOR gates 226-3, 226-4, . . . 226-12, 226-14 making all the data bits BD3, BD4, . . . , BD12, BD14, ZERO as seen in FIG. 10h. The XOR gate 226-13, on the other hand, receives ZERO of the data bit CE13 and ONE output from the inverter 228 so that its output or data bit BD13 becomes ZERO as shown in FIG. 10h.

It will be seen from FIGS. 10c and 10h that the data encoded by the encoder 200 is decoded by the decoder 200.

As previously stated, a signal in the audible band involves a substantial period of no-signal and/or low signal level condition. It follows that the logical value of each bit of the data output from the A/D converter 108 becomes ONE more frequently at lower bits adjacent to LSB than at upper bits adjacent to MSB. In light of this, the encoder 200 and decoder 220 shown in FIGS. 9a and 9b may be simplified in construction as follows.

In the encoder 200 of FIG. 9a, XOR gates are employed in one to one correspondence with all the digits of the output data of the A/D converter 108 from the digit next to MSB over to LSB. Likewise, in the decoder 220 of FIG. 9b, an XOR gate is installed for every one of the bits of the input data to the D/A converter 152 from the digit next to MSB over to LSB. In a simpler construction, the XOR gates associated with the digits adjacent to LSB may be omitted with a specific principle without affecting the outstanding effects previously discussed. In this case, the encoder 200 and decoder 220 should naturally share the same principle of the XOR gate omission.

Referring to FIGS. 13a and 13b, an alternative embodiment of the encoder 112 and decoder 148 will be described. In this embodiment, the same reference numerals as in the first embodiment designate the same structural elements.

In FIG. 13a, an encoder 300 includes a plurality of inverters 302-2, 302-4 . . . . The lines 202-1, 202-3 . . . are directly connected to the lines 204, 212-3 . . . , respectively, so that the data in the data bits BD1, BD2 . . . are output from the encoder 300 without any conversion. Meanwhile, the lines 202-2, 202-4 . . . are respectively connected to the inverters 302-2, 302-4, . . . which are in turn respectively connected to the lines 212-2, 212-4 . . . . Thus, the data of the data bits BD2, BD4 . . . are individually inverted by the encoder 300.

In FIG. 13b, a decoder 310 includes a plurality of inverters 312-2, 312-4 . . . in correspondence with the encoder 300. The lines 222-1, 222-3, . . . are directly connected with the lines 224, 232-3 . . . , respectively, whereby the data bits CD1, CD3 . . . are fed out from the demodulator 310 without conversion. The lines 222-2, 222-4 . . . are respectively connected to the inverters 312-2, 312-4 . . . which are respectively connected to the lines 232-2, 232-4 . . . . Thus, the data of the data bits CD2, CD4 . . . inverted by the encoder 300 are again inverted by the demodulator 310.

The embodiment shown in FIGS. 13a and 13b has been elaborated in view of the fact that the appearing frequency of ZERO in the digital data is higher in upper bits than lower bits due to the substantial no-signal and/or low signal level period. Thus, inverting the upper bits to make a ZERO a ONE facilitates the self-clocking operation. The arrangement shown in FIGS. 13a and 13b is not limitative, however. The gist is that inverters should be so connected as to invert the logical value in at least one of selected upper bits adjacent to MSB of the digital data.

Referring to FIGS. 14a and 14b and 15a and 15c, another embodiment of the encoder 112 and decoder 148 will be described which are applicable to a case wherein an analog signal is converted into a digital signal in the offset binary mode, that is, both the A/D converter 108 and D/A converter 152 are operated in the offset binary mode. In this embodiment, the same structural elements as those of the foregoing embodiments are designated by the same reference numerals and the description thereof will be omitted.

Figure 14A:
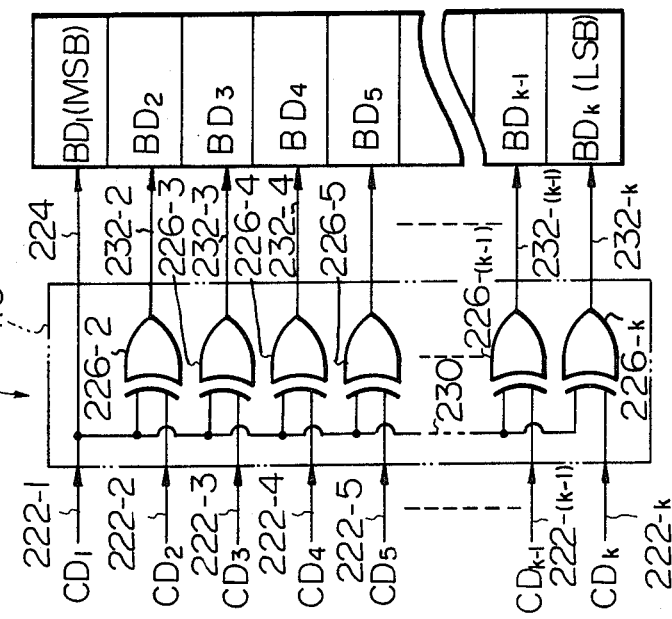
FIGS. 14a and 14b are block diagrams showing still another embodiment of the encoder and decoder circuits, respectively.
Figure 14B:
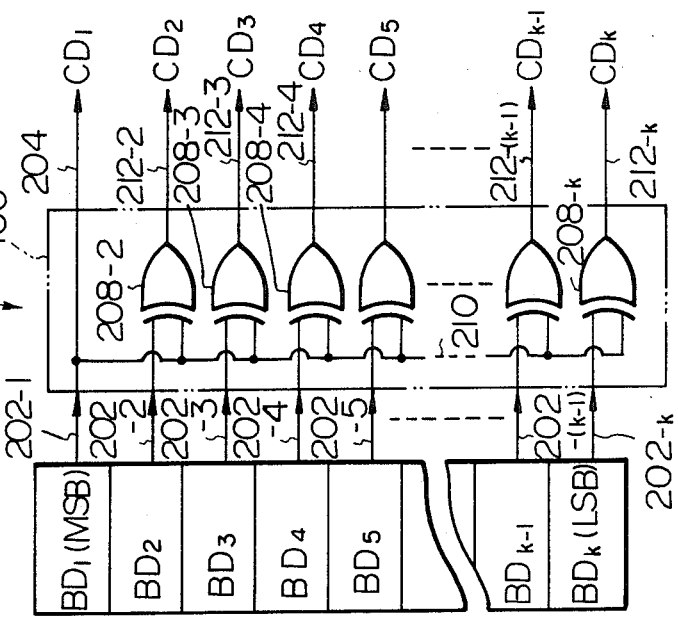

In FIGS. 14a and 14b, the inverters 206 and 228 shown in FIGS. 9a and 9b are omitted. FIGS. 15a–15c indicate different strings of data bits which have been digitized in the offset binary mode. The data shown in FIG. 15a corresponds to decimal "0" and differs from the 2's complement mode data of FIG. 10a in that it has ONE in its data bit BD1 or MSB. The data shown in FIG. 15b corresponds to decimal "2" and differs from the 2's complement mode data of FIG. 10c in that it has ONE in its data bit BD1 or MSB. Further, the data shown in FIG. 15c represents decimal "−2" and differs from the 2's component mode data of FIG. 10e in that it has ZERO in its data bit BD1 or MSB. In short, in the offset binary mode the MSB's logical value is inverse to that of the 2's complement mode. This is the reason why the inverters 206 and 228 are omitted as shown in FIGS. 14a and 14b.

As described above, a data train output from an A/D converter which operates in the offset binary mode will have ZEROES in all the bits thereof when the input analog signal voltage corresponds to the negative full scale. The output digital data will have ONE'S in all the bits thereof when the input analog signal voltage corresponds to the positive full scale. Further, the output digital data will have ONE only in its MSB and logical ZEROES in all the other bits when the voltage is 0V. Thus, the offset binary mode A/D and D/A conversion is advantageous over the 2's complement mode A/D and D/A conversion in the aspect of self-clocking during reproduction because the digital signal necessarily contains one ONE even when the analog signal is 0V. Still, the number of ONE'S in the digital data is small in the offset binary mode in the vincinity of positive 0V of the analog signal, as has been the case with the 2's complement mode.

The embodiment of FIGS. 14a and 14b is common in operation to that of FIGS. 9a and 9b except that it performs the operation directly on the logical values in the data bits BD1 and CD1.

While the present invention has been shown and described in connection with the positive logic in which the signal level in reversed in response to a ONE, it is applicable to the negative logic in which the signal level will be reversed in response to a ZERO as illustrated in FIG. 16.

In summary, it will be seen that the present invention promotes stable self-clocking by means of a simple circuitry and thereby makes it possible to employ the NRZI modulation system, which is desirable for recording data on or reproducing data from a magnetic recording medium. This is successful in increasing the recording density.

Various modifications will become possible for those skilled in the art after receiving the teachings of the present disclosure without departing from the scope thereof. For example, the magnetic recording medium may comprise a magnetic drum, magnetic disc or the like instead of the magnetic tape shown and described. Another possible application of the present invention is to the transfer to another system or terminal unit the digitized version of a signal in the audible band such as a voice or music signal. The constructions of the encoder and decoder shown and described may be replaced with any other desired ones insofar as the "true" bit can be increased in number as shown in FIG. 12.

What is claimed is:

1. A magnetic recording method which records digital data on a magnetic recording medium after modulation the digital data by the NRZI (Non-Return-to-Zero Inverted) system and causes the modulated data to be read from the recording medium, timed to magnetic flux reversal caused by the recorded data on the recording medium, comprising the steps of:

(a) encoding the digital data before the NRZI modulation to convert at least part of "false" bits contained in the digital data into "true" bits; and (b) demodulating the NRZI modulated data which is read from the recording medium and then decoding the demodulated data;

step (a) comprising a step of leaving MSB (Most Significant Bit) of the digital data as it is while converting a logical value of each of the other bits, the bit next to MSB over to LSB (Least Significant Bit), by obtaining XOR (Exclusive OR) based on a logical value which is the inverted version of a logical value of MSB;

step (b) comprising a step of leaving MSB of the modulated digital data as it is while re-converting the converted logical value of each of the other bits, the bit next to MSB over to LSB, by obtaining XOR based on a logical value which is the inverted version of a logical value of MSB.

2. A magnetic recording method as claimed in claim 1, in which the digital data is represented by the 2's complement mode.

3. A magnetic recording method which records digital data on a magnetic recording medium after modulation the digital data by the NRZI (Non-Return-to-Zero Inverted) system and causes the modulated data to be read from the recording medium, timed to magnetic flux reversal caused by the recorded data on the recording medium, comprising the steps of:

(a) encoding the digital data before the NRZI modulation to convert at least part of "false" bits contained in the digital data into "true" bits; and (b) demodulating the NRZI modulated data which is read from the recording medium and then decoding the demodulated data;

the digital data being represented by the offset binary mode;

step (a) comprising a step of leaving MSB of the digital data as it is while converting a logical value of each of the other bits, the bit next to MSB over to LSB, by obtaining XOR based on a logical value of MSB, step (b) comprising a step of leaving MSB of the demodulated digital data as it is while re-converting the converted logical value of each of the other bits, the bit next to MSB over to LSB, by obtaining XOR on the basis of a logical value of MSB.

4. A magnetic recording apparatus in which digital data is recorded on a magnetic recording medium after being modulated by the NRZI system, and read from the recording medium timed to magnetic flux reversal caused by the recorded data on the recording medium, comprising:

(a) encoder means for encoding the digital data before the NRZI modulation to convert at least part of "false" bits contained in the digital data into "true" bits; and (b) decoder means for demodulating the NRZI modulated data which is read from the recording medium and then decoding the bits encoded by the encoder means;

the digital data being represented by the 2's complement mode;

the encoder means comprising means for leaving MSB (Most Significant Bit) of the digital data as it is while converting a logical value of each of the other bits, the bit next to MSB over to LSB (Least Significant Bit), by obtaining XOR (Exclusive OR) based on a logical value which is the inverted version of a logical value of MSB, the decoder means comprising means for leaving MSB of the demodulated digital data while re-converting the converted logical value of each of the other bits, the bit next to MSB over to LSB, by obtaining XOR based on a logical value which is the inverted version of a logical value of MSB.

5. A magnetic recording apparatus in which digital data is recorded on a magnetic recording medium after being modulated by the NRZI system, and read from the recording medium timed to magnetic flux reversal caused by the recorded data on the recording medium, comprising:

(a) encoder means for encoding the digital data before the NRZI modulation to convert at least part of "false" bits contained in the digital data into "true" bits; and (b) decoder means for demodulating the NRZI modulated data which is read from the recording medium and then decoding the bits encoded by the encoder means;

the digital data being represented by the offset binary mode;

the encoder means comprising means for leaving MSB of the digital data as it is while converting the logical value of each of the other bits, the bit next to MSB over to LSB, by obtaining XOR based on a logical value of MSB, the decoder means comprising means for leaving MSB of the demodulated digital data as it is while re-converting the converted logical value of each of the other bits, the bit next to MSB over the LSB, by obtaining XOR on the basis of the logical value of the MSB.

* * * * *